Dec. 20, 1966  A. L. WELCH ETAL  3,292,445
VARIABLE V-BELT DRIVE
Filed April 14, 1964  2 Sheets-Sheet 1
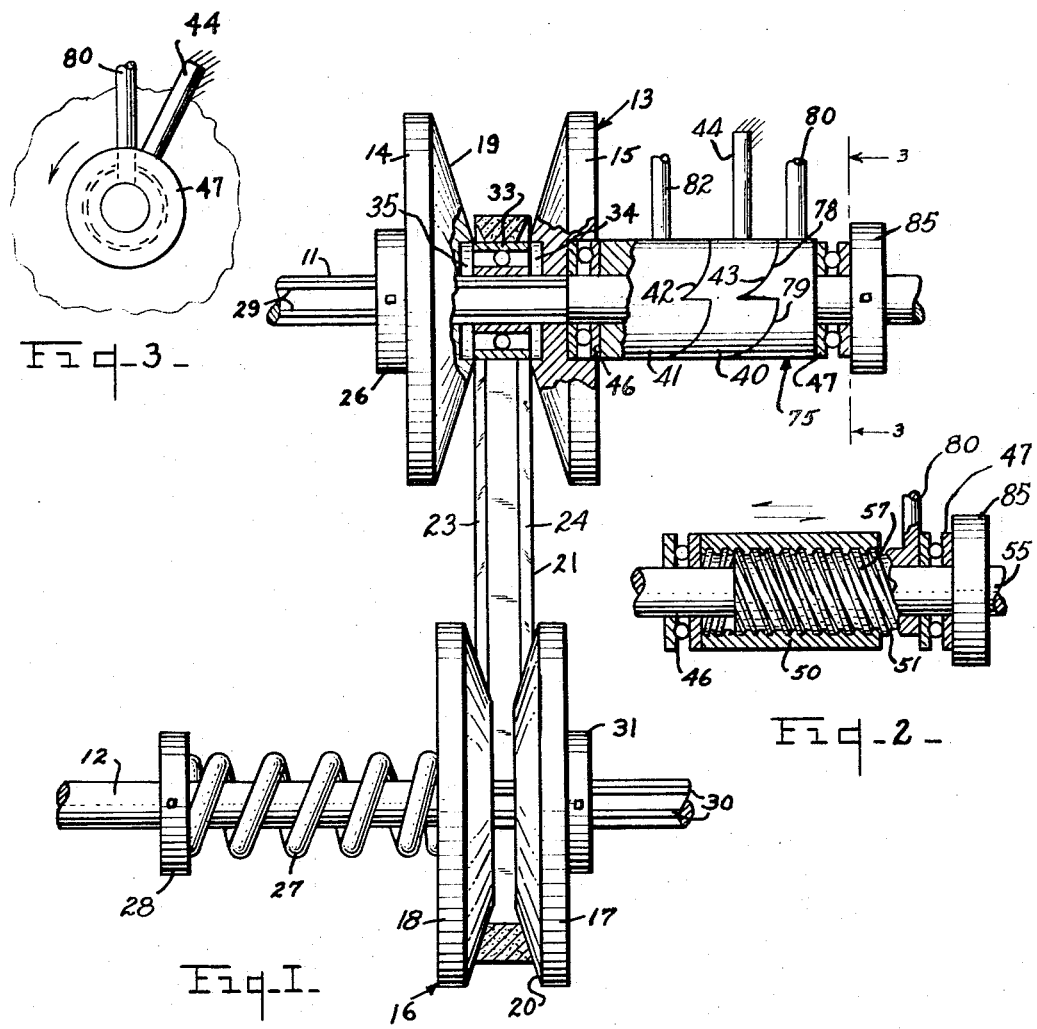
INVENTORS.
ARTHUR L. WELCH.
JOSEPH B. LINDECKER.

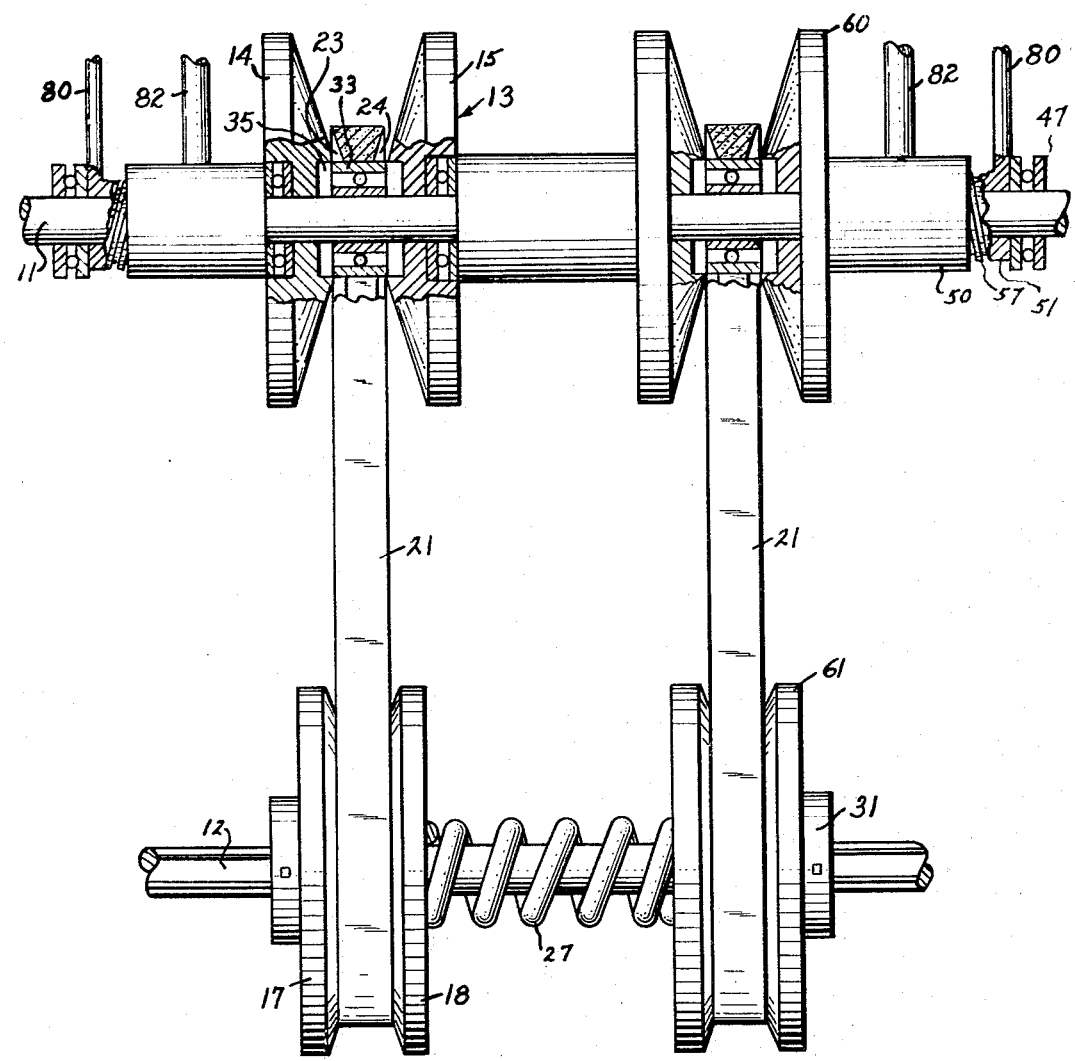

United States Patent Office 3,292,445
Patented Dec. 20, 1966

3,292,445
VARIABLE V-BELT DRIVE
Arthur L. Welch, Box 731, Wasilla, Alaska 99687, and Joseph B. Lindecker, 8100 Keystone Ave., Skokie, Ill. 60076
Filed Apr. 14, 1964, Ser. No. 359,637
3 Claims. (Cl. 74—230.17)

This invention relates to an improvement in V-belt drives of the variable ratio type, and more particularly to the method of applying pressure to the driving pulley of said drive in order to vary the ratio thereof.

This invention relates more specifically to variable speed power transmitting systems employing variable diameter V-pulleys, in which the V-pulleys are made in two separable halves, and variations in diameter are attained by shifting one of the halves toward and away from the other half.

Variable V-belt drives are well known in the industry. In one type the pressure application means used to vary the driving V-pulley diameter consists of a simple lever thrusting force against the movable half of the driving V-pulley. This induces end thrust into the prime-mover rotating shaft, which could be the crankshaft of an internal combustion engine, or the armature shaft of an electric motor. Since end thrust is generally a problem in either case, the introduction of further end thrust has limited the use of variable V-belt drives.

The principal object of this invention is the provision of a self-contained pressure application means which will not introduce outside end thrust into the prime mover. This self-contained pressure application means is also easier to operate and more positive in action than presently known devices in the field.

A further object of this invention is the provision of an anti-friction idler bearing between the driving V-pulley halves which provides a clutch mechanism to effect a neutral, non-power transmitting position.

Another object is a safety device consisting of a manually operated clutch mechanism which stops power transmission when released.

More specific objects and features of the invention will appear from the following detailed description which refers to the drawing.

In the drawing:

FIGURE 1 is a plan view of a variable speed V-belt drive mechanism employing this invention, with some parts broken away and in section;

FIGURE 2 is a fragmentary longitudinal section through modified operating cylindrical screw type sleeves and mounted on the driving shaft shown in FIG. 1;

FIGURE 3 is a fragmentary vertical sectional view taken on line 3—3 of FIG. 1, and FIGURE 4 is a plan view of a modified type of V-belt drive mechanism with dual V-type pulleys on each shaft.

In the drawing a drive shaft from which the power to be transmitted is received is indicated at 11 and a driven shaft to which the power is to be transmitted is indicated at 12. In an automotive vehicle, the shaft 11 would probably be the crank shaft of the engine, and upon the shaft 11 is mounted the drive pulley 13 with pulley elements 14 and 15. Pulley 13 drives the driven pulley 16 with pulley elements 17 and 18, respectively, mounted on shaft 12. The pulley 13 is adapted to be rotated in the same direction as the power shaft 11, and is therefore provided with a pulley groove 19; the driven shaft 12 also to be rotated in the same direction as shaft 11 with pulley 16 rotating in the same direction as pulley 13 is provided with a pulley groove 20, and over these pulley grooves 19 and 20 is looped the belt 21. As in all V-belt drives, the belt 21 is assembled and arranged under sufficient tension by the location of the V-type pulleys 13 and 16 to provide ample traction in the grooves 19 and 20 of said pulleys to transmit power.

The V-pulleys 13 and 16 are constructed, as are substantially all V-pulleys, of two frustrum type cone-shaped discs 14, 15, 17 and 18, respectively, having concentric splined bores adapted to be slidably mounted on the splined surfaces of the shafts 11 and 12. Said cone-shaped discs 14, 15, 17 and 18 are mounted tapered side to tapered side, providing grooves 19 and 20 with inclined side walls adapted to receive the like tapered sides 23 and 24 of the endless V-belt 21 which is trapezoidal in cross-section for power transmission purposes.

The pressure application means of the driven pulley is a simple compression type coil spring 27 which supplies compression force by a stop collar 28 rigidly secured to the driven shaft 12 at a desired location. The pulley element 14, a fixed half of pulley 13, is positioned by the stop collar 26. The fixed disc 14 and the movable disc 15 are drivably secured to the drive shaft 11 by keys 29 or splines in elongated keyways in the shaft 11. The fixed disc 17 and movable disc 18 are drivably secured to the driven shaft 12 by keys 30 in elongated keyways in shaft 12. Since it is clearly seen that the movable halves 15 and 18 of the pulleys are free to slide axially on the shafts 11 and 12, it can be seen that the V-belt 21 will always be maintained under tension by said spring 27, the fixed disc 17 being positioned by the stop collar 31.

The inclined planes of the V-pulley halves are customarily machined to about 19° angle relative to normal plane passing through shafts 11 and 12. The widths of the V-pulley grooves 19 and 20 are controlled by vertical movement of the belt 21 traveling therein. The width of the pulley elements 14 and 15, and 17 and 18, at the bore is controlled by the width of the inside of the V-belt 21, plus a suitable land on the circumference of the V-pulley halves providing stiffness to said pulley halves. The depth of the V-grooves is therefore also controlled by the width of the V-belt 21, since to transmit maximum power the sides of said V-belt must remain in contact with the inclined planes of the pulley halves. The width of the inclined plane on each pulley half element can therefore be equal to approximately one-half the width of the inside surface of the V-belt 21. With wide V-belts as presently manufactured, the ratio between driving and driven pulleys of variable V-belt drives is as much as 4 to 1, the speed of the driven shaft 12 being ½ the speed of the driving shaft 11, with the driving pulley 13 fully spread and the driven pulley 16 fully compressed; and with the speed of the drive shaft 11 being double the speed of the driven shaft 12 with the driving pulley 13 fully compressed and the driven pulley 16 fully spread, or expanded.

The driving V-pulley 13 has each half 14 and 15 recessed as by counterboring to receive the anti-friction bearing 33, said recesses being numbered 34 and 35 in FIG. 1, said bearing 33 acting as an idler to provide a neutral, non-power transmitting position when the driving pulley 13 is fully expanded. In this neutral position the inner face of the V-belt 21 rides on the bearing outer surface, with the power transmitting sides of the V-belt 21 being free of contact with the inclined planes of the pulley halves 14 and 15. See FIG. 1.

The pressure application means of the driving pulley 13 comprises a pair of coaxially aligned, axially movable, cylindrical sleeves 40 and 41, arranged adjacent each other end to end, with bores sized to freely rotate on the driving shaft 11. Said sleeves terminate at their adjacent ends in a plurality of inclined planes 42 and 43 formed on said adjacent sleeve ends. The sleeve 40 is anchored against rotation by the lever 44 which is further anchored to some part of the machine not shown. Anti-friction thrust bearings 46 and 47 assembled over shaft 11 permit rotational movement of the pulley halves 14 and 15 while the pressure application sleeves 40 and 41 remain stationary. The stop collar 85 positions the sleeves 40 and 41 so that the rotation of the sleeve 41 causes the inclined planes 42 and 43 on the ends of the said sleeves 40 and 41 to spread apart from each other axially on shaft 11, the movable pulley half 15 being slidably moved toward the fixed pulley half 14, causing the inclined planes 19 of said pulley halves 14 and 15 to contact the driving sides 23 and 24 of the V-belt 21, thus starting the transmission of power to pulley 16 and shaft 12.

A safety device comprised of a second cam mechanism, shown in FIG. 1, provides a clutch mechanism 75 to start or stop the power transmission. Movement of the cam surfaces 78 and 79 moves the driving pulley 15 toward the driving pulley half 14, thus narrowing the width of the groove 19 and causing the V-belt 21 to find traction on the inclined surfaces of the pulley halves 15 and 14, thus starting the power transmission.

Longitudinal movement of the movable pulley half 15 caused by actuation of the clutch cams 78 and 79 must be slightly greater than the movement of pulley halves 15 caused by actuation of cams 42 and 43, so that the V-belt driving surfaces will be free of the driving surfaces of the pulley halves 15 and 14 when said clutch cams 78 and 79 are released. It can be seen that the clutch actuating lever 80 and sleeve actuating lever 82 must be manually held in actuated position so that when the levers 80 and 82 are released, the cams will close to allow movable V-pulley half 15 to release belt 21 from power transmitting position.

An alternate method of pressure appliaction to the movable half 15 of the driving V-pulley 13 is arranged as shown in FIG. 2; the sleeve 50 similar to sleeve 40 of FIG. 1, is arranged in threaded engagement with sleeve 51 modified as compared to sleeve 41 of FIG. 1, said sleeve 50 having internal threads and threaded upon sleeve 51 having external threads and moves longitudinally relative threeto as well as rotatably therewith. In operation of this form, the driving sleeve 51 is moved longitudinally of the sleeve 50 and upon shaft 55 and will force bearing member 46 toward pulley member 15, forcing member 15 toward pulley member 14 to provide power transmitting means.

Sleeve 50 is adapted to rotate and move axially over the external threads 57 of sleeve 51.

It can be seen that the rotational movement of sleeve 51 against non-rotating sleeve 50 will cause axial spreading of the two sleeves 50 and 51, thereby slidably moving the movable V-pulley half or disc 15 into power transmitting contact with the V-belt 21.

A further modification of the invention is seen in FIG. 4 where dual variable V-belt drive assemblies can be assembled on a common shaft to form a two-V-belt drive mechanism. Pulleys 60 and 61 are assembled upon shafts 11 and 12 along with the elements shown in FIG. 1, collars 26 and 85 being eliminated since they are not needed. This dual assembly will transmit heavier loads where needed.

Application of the invention other than those specifically disclosed will be obvious to those skilled in the art, and the invention is therefore to be limited only as set forth in the appended claims.

We claim:
1. In a machine of the type described, comprising a drive shaft and a driven shaft, each of said shafts having a V-pulley with a pair of separable associated members mounted in alignment with each other, an endless V-belt of constant length looped over both said pulleys with its V-shaped inner surface in the driving relation therewith, the constant length of said endless V-belt governing the effective diameter of said V-pulley on said driven pulley, each V-pulley having one of its members fixed to its supporting shaft and with the second members thereof movably mounted on said shafts permitting longitudinal movement thereof, a pair of rotatable sleeves, one sleeve having internal threads and the other external threads, said sleeves arranged on said drive shaft adjacent the movable member of said V-pulley on said drive shaft effecting longitudinal movement of said movable member on said drive shaft toward its associated fixed member and effecting increased diameter of said V-pulley on said drive shaft, a helical spring mounted on said driven shaft and compressed between the movable member of the V-pulley on said driven shaft and a fixed stop means mounted on said driven shaft and spaced a suitable distance from said V-pulley on said driven shaft effecting resilient pressure on the contacted movable member of said V-pulley on said driven shaft with the associated member through the intermediation of said belt spaced therebetween, and an anti-friction bearing mounted in direct contact with said drive shaft and arranged between the two members of said V-pulley on said drive shaft to provide an idler means on said drive shaft.

2. In a machine of the type described, comprising a drive shaft and a driven shaft, each of said shafts having a V-pulley with a pair of pulley halves mounted in alignment with each other, an endless V-belt of constant length looped over both said pulleys with its V-shaped inner surface in the driving relation therewith, the constant length of said endless V-belt governing the effective diameter of said V-pulley on said driven pulley, each V-pulley having one of its pulley halves fixed to its supporting shaft and with the second pulley half thereof movably mounted on said shafts permitting longitudinal movement thereof, a pair of coaxially aligned, axially movable, cylindrical sleeves, arranged adjacent each other end to end on said drive shaft, said sleeves terminating at their adjacent ends in a plurality of cam surfaces formed on said adjacent sleeve ends, an anti-friction thrust bearing assembled over said drive shaft between said movable pulley second half of said V-pulley on said drive shaft and the first sleeve nearest said V-pulley, the second sleeve at a greater distance from said V-pulley on said drive shaft being anchored against rotation on said drive shaft by suitable means, rotatable movement of said first sleeve effecting longitudinal movement thereof and moving same from said second sleeve due to said cam surfaces on adjacent ends thereof, said longitudinal movement of said first sleeve effecting longitudinal movement of said anti-friction bearing and said movable pulley half on said drive shaft effecting increased diameter of said V-pulley on said drive shaft, a helical spring mounted on said driven shaft and compressed between the movable pulley half of the V-pulley on said driven shaft and a fixed stop means mounted on said driven shaft and spaced a suitable distance from said V-pulley on said driven shaft effecting resilient pressure on the contacted movable pulley half of said V-pulley on said driven shaft with the associated pulley half through the intermediation of said belt spaced therebetween, and an anti-friction bearing mounted in direct contact with said drive shaft and arranged between the two pulley halves of said V-pulley on said drive shaft to provide an idler means on said drive shaft.

3. In a machine of the type described, comprising a drive shaft and a driven shaft, each of said shafts having a V-pulley with a pair of pulley halves mounted in alignment with each other, an endless V-belt of constant length looped over both said pulleys with its V-shaped inner surface in the driving relation therewith, the constant length of said endless V-belt governing the effective diameter of said V-pulley on said driven pulley, each V-pulley having one of its pulley halves fixed to its supporting shaft and with the second pulley half thereof movably mounted on said shafts permitting longitudinal movement thereof, three coaxially aligned, axially movable, cylindrical sleeves, arranged adjacent each other end to end on said drive shaft, an anti-friction thrust bearing assembled on said drive shaft between said movable second pulley half of said V-pulley on said drive shaft and the first of said three cylindrical sleeves, each of said three sleeves terminating at their adjacent ends in a plurality of cam surfaces, the second of said three cylindrical sleeves that is more distant from said thrust bearing than said first sleeve being anchored against rotation by suitable means, rotatable movement of said first sleeve effecting longitudinal movement thereof away from said second sleeve due to said adjacent cam surfaces therebetween, said longitudinal movement of said first sleeve further effecting longitudinal movement of said thrust bearing and said movable pulley half on said drive shaft effecting increased diameter of said V-pulley on said drive shaft, a helical spring mounted on said driven shaft and compressed between the one movable pulley half of the V-pulley on said driven shaft and a fixed stop means mounted on said driven shaft and spaced a suitable distance from said V-pulley on said driven shaft effecting resilient pressure on the contacted movable pulley half of said V-pulley on said driven shaft with the associated pulley half through the intermediation of said belt spaced therebetween, an anti-friction bearing mounted in direct contact with said drive shaft and arranged between the two pulley halves of said V-pulley on said drive shaft to provide an idler means on said drive shaft, and the third of said cylindrical sleeves being rotatable forming a clutch mechanism, said third sleeve spaced from a stop collar secured to said drive shaft, a thrust bearing assembled between said stop collar and said third sleeve on said drive shaft, rotatable movement of said third sleeve effecting longitudinal movement of both said first and second sleeves toward said V-pulley on said drive shaft thereby effecting movement of the second pulley half of said V-pulley on said drive shaft and the narrowing of the width of the groove between the pulley halves of the V-pulley on said drive shaft effecting the V-belt to find traction on the inclined surfaces of the pulley halves and further effecting starting the movement of said V-belt and the pulley on said driven shaft.

References Cited by the Examiner
UNITED STATES PATENTS

| | | | |
|---|---|---|---|
| 2,508,558 | 5/1950 | Wolff | 74—230.24 X |
| 2,920,493 | 1/1960 | Pinder | 74—230.17 |
| 2,924,994 | 2/1960 | Adee | 74—230.17 X |
| 2,987,933 | 6/1961 | Barnes | 74—230.17 |
| 3,115,045 | 12/1963 | Schaufler | 74—230.17 |

DAVID J. WILLIAMOWSKY, *Primary Examiner.*

L. H. GERIN, *Assistant Examiner.*